US006816914B1

(12) United States Patent
Heinzman et al.

(10) Patent No.: US 6,816,914 B1
(45) Date of Patent: *Nov. 9, 2004

(54) CALLABLE GRAPHICAL PROGRAMMING LANGUAGE

(75) Inventors: William Heinzman, Boulder, CO (US); Kenneth Colasuonno, Fort Collins, CO (US)

(73) Assignee: Agilent Technologies, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/581,124

(22) Filed: Dec. 29, 1995

(51) Int. Cl.[7] .................................................. G06F 9/54
(52) U.S. Cl. .......................................... 709/328; 717/1
(58) Field of Search ................................ 395/684, 682, 395/704, 340, 326, 331, 333, 335

(56) References Cited

U.S. PATENT DOCUMENTS

| | | | | | |
|---|---|---|---|---|---|
| 4,901,221 A | * | 2/1990 | Kodosky et al. | ............ | 345/348 |
| 5,218,699 A | * | 6/1993 | Brandle et al. | ............. | 709/328 |
| 5,287,447 A | * | 2/1994 | Miller et al. | ................. | 345/342 |
| 5,325,481 A | * | 6/1994 | Hunt | .......................... | 345/347 |
| 5,379,374 A | * | 1/1995 | Ishizaki et al. | ............. | 345/331 |
| 5,410,648 A | * | 4/1995 | Pazel | ............................ | 717/4 |
| 5,497,500 A | * | 3/1996 | Rogers et al. | .................. | 717/1 |
| 5,546,519 A | * | 8/1996 | Berry | .......................... | 345/326 |
| 5,583,988 A | * | 12/1996 | Crank et al. | ................... | 714/48 |
| 6,014,147 A | * | 1/2000 | Politis et al. | ............... | 345/435 |

OTHER PUBLICATIONS

W. R. Stevens, UNIX Network Programming, Prectice Hall Software series, Chapter 18, Appendix A.3, 00/00/1990.*
J. Caven and J. Jackman, "An Icon–Based Approach to System Control Development", IEEE Trans. Industrial Electronics, vol. 37, No. 3, 00/06/90.*
(no author given), "Introduction to the Win32 Application Programming Interface," http://www.cs.pvamu.edu/~dhobson/intro32.htm, pp. 1–13, Jul. 1994.

* cited by examiner

*Primary Examiner*—St. John Courtenay, III

(57) ABSTRACT

A graphical programming language (GPL) that allows GPL user functions to be callable from other software. The present invention employs a client/server model to allow GPL user functions to be called, much like a procedure from one language is called by a second language. The client is a library of 'C' procedure calls. The GPL server is the service. This allows a GPL user function to be called by any application that can link in the 'C' library. The 'C' client can exist on a separate machine from the GPL service or on the same machine in the presence of a multitasking operating system. When calling a GPL user function, the arguments of the 'C' call correspond to the input and output terminals of the GPL user function. The data being sent to the GPL user function is the input data. The data being returned from the GPL user function is the result from the execution of the GPL user function. The input data of the arguments and the results are GPL data types, known as containers. A container is a GPL complex data type that encapsulates all information about the data. Thus, when a GPL function is called from 'C' code, the primitive data types in 'C' are encapsulated into GPL containers. Conversely, when results are received back from a GPL function call, the primitive data types in 'C' are removed from the container so that the 'C' code may use the data.

1 Claim, 3 Drawing Sheets

CALLABLE GRAPHICAL PROGRAMMING LANGUAGE

CROSS-REFERENCE TO OTHER APPLICATIONS

The following applications are of common assignee and contain some common disclosure.

"Instrument Descriptor (ID) Monitor," U.S. Pat. No. 5,754,426, incorporated herein by reference in its entirety;

"A To/From Socket Object"; U.S. patent application Ser. No. 08/581,123, now abandoned, incorporated herein by reference in its entirety; and "A Multi-Device Direct I/O Object," U.S. Pat. No. 6,016,143, incorporated herein by reference in its entirety.

BACKGROUND OF THE INVENTION

1. Field of the Invention

The present invention relates generally to the field of graphical programming languages, and more particularly, to a library of function calls that allow a graphical programming language user function to be callable by other software applications.

2. Related Art

In textual languages such as C, PASCAL, or BASIC, one programs using keywords following rules of syntax. In graphical languages, one connects icons together using a mouse to generate a program resembling a data flow diagram. Hewlett Packard Visual Engineering Environment (HP VEE) for Windows is a graphical programming language (GPL) designed for test and measurement applications.

In a GPL, one programs by selecting objects (icons) from menus, placing those objects within a working area environment, and connecting them together using a mouse. The lines connecting the objects carry data or control signals.

In many areas customers are content to have the GPL be the central piece of software in their test systems. While GPLs may call routines written in other languages, such as PASCAL, C, or FORTRAN, the GPL is still the controlling software in the integrated system. However, in many cases customers want the reverse, a GPL that is callable from other software. Hewlett Packard (HP) currently supports the ability for HP VEE to call user functions remotely, but does not support the reverse, that is, being able to call HP VEE from other software.

SUMMARY OF THE INVENTION

The present invention is directed towards a graphical programming language (GPL) that is callable from other software languages, such as PASCAL, C, or FORTRAN. The present invention allows user functions from a GPL to be called, much like a procedure from one textual language is called by a second textual language. The present invention uses a client/server configuration to allow GPL user functions to be callable from other software applications. The client is a library of 'C' procedure calls. The GPL server is the service. Thus, GPL user functions can be called by any application that can link in the 'C' library.

The present invention allows the client to exist on a separate machine from the GPL service or on the same machine in the presence of a multitasking operating system. When the client exists on a separate machine, the client and the server can communicate via various network communication protocols, such as Inter-Process Communication (IPC) based on TCP/IP protocols. IPC based on TCP/IP protocols is well known to a person skilled in the relevant art. A Berkeley socket application programmer interface (API) is written on top of TCP/IP. A further description of a Berkeley socket API is found in the above cross-referenced patent application titled, "A To/From Socket Object"; U.S. patent application Ser. No. 08/581,123, now abandoned.

The 'C' library consists of two separate application programmer interfaces (APIs). The first API instantiates the GPL environment, loads in user functions, and executes the user functions. Since GPLs are interpreted languages and are not compiled, a GPL environment must be instantiated and present to load in libraries and execute user functions.

When a 'C' library procedure call invokes a GPL user function, the arguments of the call correspond to the input and output terminals on the user function. The data being sent to the GPL user function is the input data. The data being returned from the GPL user function is the result of the execution of the GPL user function. The data of the arguments and the results are GPL data types, known as containers. A container is a complex data type that encapsulates all information about the data. When calling a GPL user function from 'C' code it is necessary to encapsulate the primitive data types in 'C' into GPL containers. Conversely, when receiving results back from a GPL function call, it is necessary to remove the primitive type from the container so that the 'C' code may use the data. The second API in the 'C' library builds and unbuilds these containers.

The GPL user function executes in the GPL server, which is a separate process. The GPL user function can be executed in one of two modes, a normal execution mode or a debug execution mode. The normal execution mode allows the GPL user function to execute in a normal fashion, i.e., execution without being able to view the user function. The debug execution mode allows the user to view the user function in a debug window. At the beginning of execution an implicit break point is set on the user function. The user can set breakpoints within the user function and then step into the function using the step button or the continue button. The user can then proceed through the entire function until execution has stopped. At the end of execution, the debug window will disappear.

The present invention can ideally be run on different, heterogeneous machines, such as a PC running WIN95 and a SUN workstation, or it can be run on the same machine. This client/server model for linking in GPL user functions allows for a high level of concurrence and distribution as well as heterogeneity.

BRIEF DESCRIPTION OF THE DRAWINGS

The present invention will be described with reference to the accompanying drawings, wherein.

DETAILED DESCRIPTION OF THE INVENTION

The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention.

Figure 1:
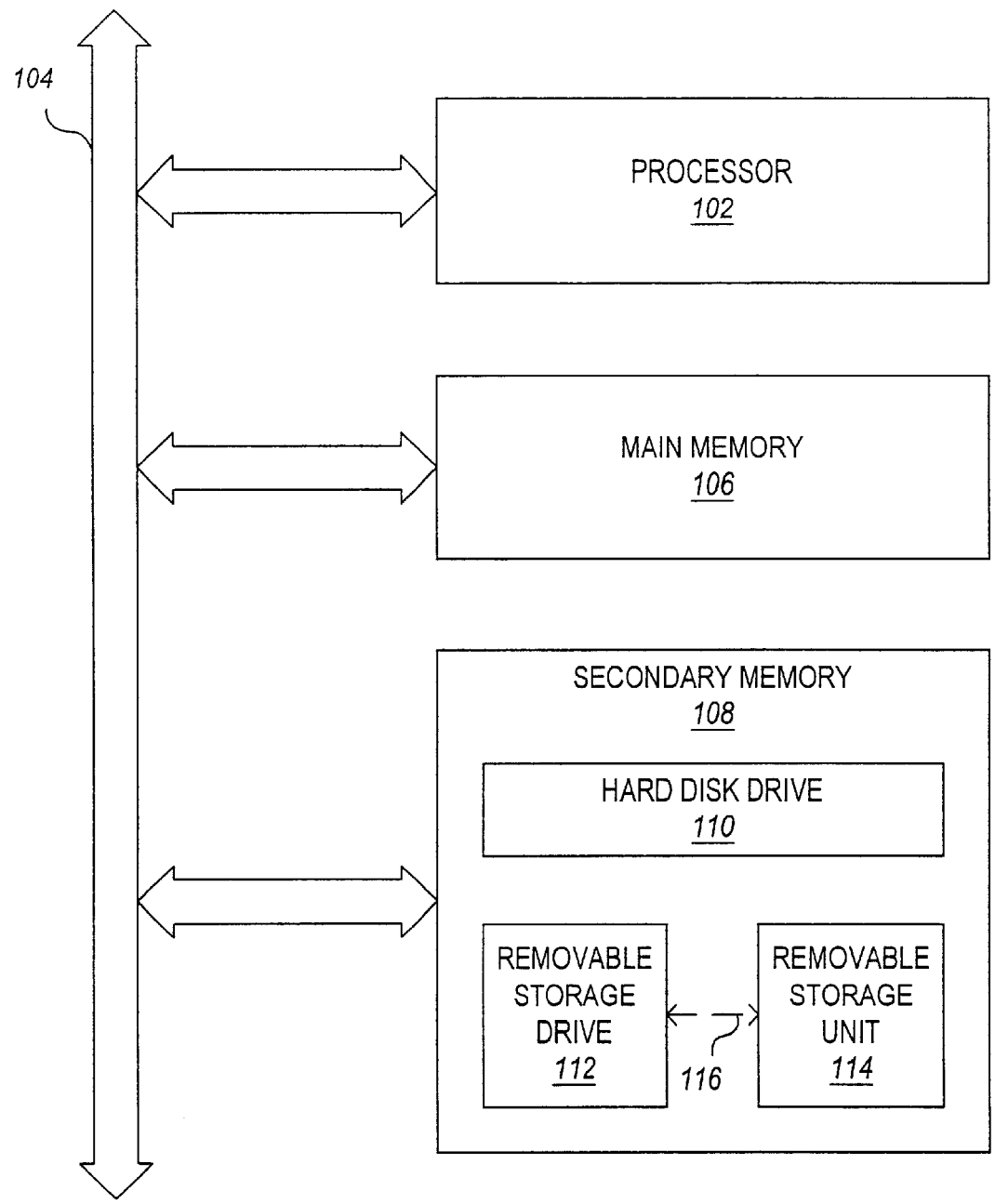
FIG. 1 illustrates an exemplary computer system in which the present invention may be embodied.

In one embodiment, the present invention is directed to a computer system operating as discussed herein. An exemplary computer system 100 is shown in FIG. 1. The computer system 100 includes one or more processors, such as processor 102. The processor 102 is connected to a communication bus 104.

The computer system 100 also includes a main memory 106, preferably random access memory (RAM), and a secondary memory 108. The secondary memory 108 includes, for example, a hard disk drive 110 and/or a removable storage drive 112, representing a floppy disk drive, a magnetic tape drive, a compact disk drive, etc. The removable storage drive 112 reads from and/or writes to a removable storage unit 114 in a well known manner.

Removable storage unit 114, also called a program storage device or a computer program product, represents a floppy disk, magnetic tape, compact disk, etc. The removable storage unit 114 includes a computer usable storage medium having stored therein computer software and/or data.

Computer programs (also called computer control logic) are stored in main memory 106 and/or the secondary memory 108. Such computer programs, when executed, enable the computer system 100 to perform the features of the present invention as discussed herein. In particular, the computer programs, when executed, enable the processor 102 to perform the features of the present invention. Accordingly, such computer programs represent controllers of the computer system 100.

In another embodiment, the invention is directed to a computer program product comprising a computer readable medium having control logic (computer software) stored therein. The control logic, when executed by the processor 102, causes the processor 102 to perform the functions of the invention as described herein.

The present invention allows a graphical programming language user function to be callable from other software, such as PASCAL, C, or FORTRAN. The present invention employs a client/server model to allow GPL user functions to be called, much like a procedure from one textual language is called by a second textual language. The client is a library of 'C' procedure calls. The GPL server is the service. Any application that can link in this 'C' library can call a GPL user function. The client can exist on a separate machine from the GPL server or on the same machine in the presence of a multitasking operating system.

Figure 2:
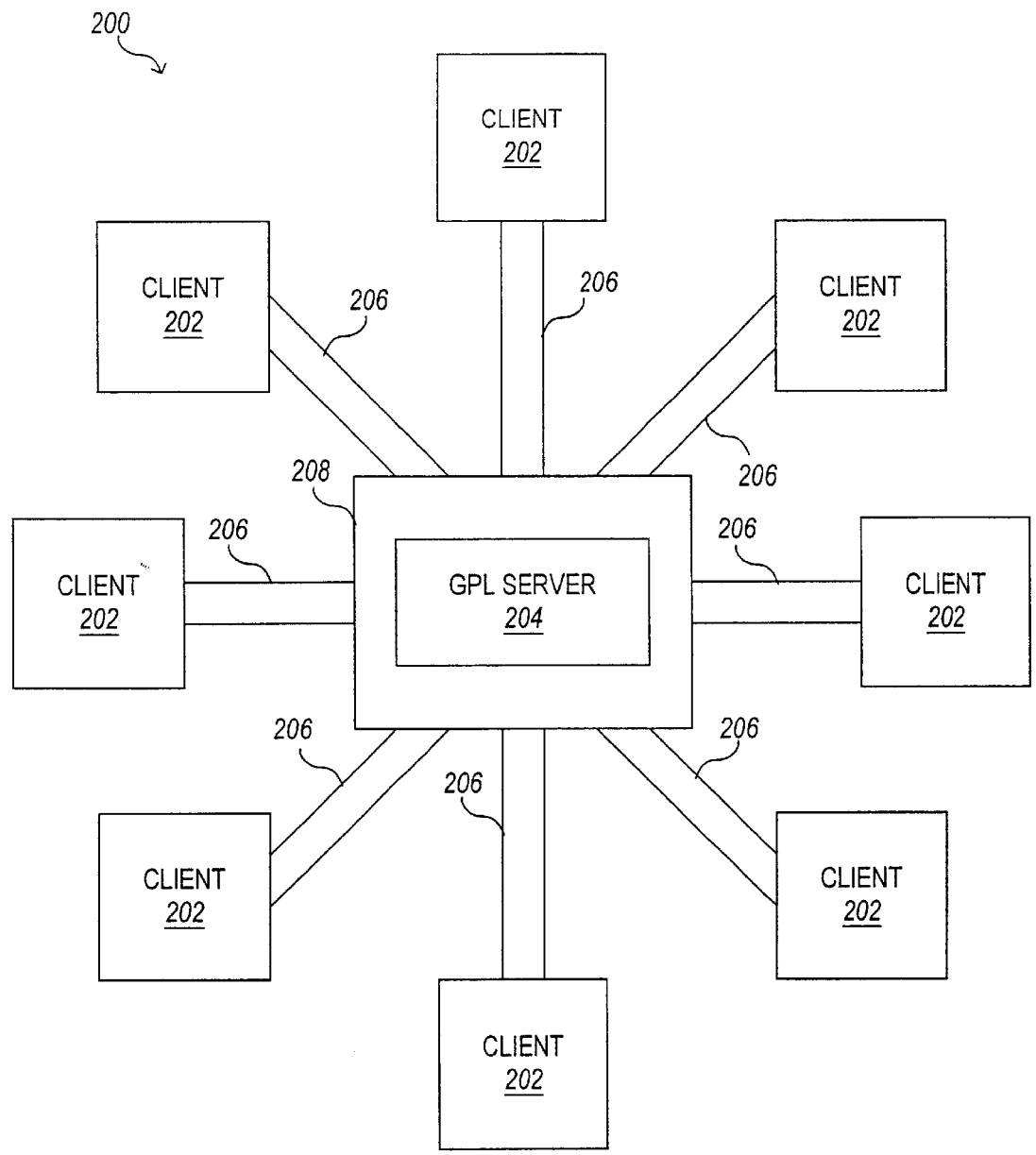
FIG. 2 illustrates an exemplary network topology in which the present invention may be embodied.

Prior to describing the invention in detail, a simplified description of an exemplary client/server model 200 is provided in FIG. 2. The client/server model 200 is represented as a star network. The star topology is used only as an example client/server network topology. Other topologies are equally applicable, such as bus or ring topologies. Star, bus, and ring topologies are well known to a person skilled in the relevant art.

The client/server model 200 network is laid out so that all of its client nodes 202 radiate from a central controlling node 208. This controller 208 is a computer containing a GPL server 204 that runs the GPL user functions. The controller 208 is connected to each client node 202 through a dedicated channel 206, so it can explicitly direct a transmission to any one client node 202 rather than broadcast it to the entire network. The controller 208 must know the address of each client node 202 and the channel 206 through which it is connected. The controller 208 is responsible for reading the destination address of each packet of information and routing it through the appropriate channel 206. Each client node 202 is represented as a processor that can link in the 'C' library procedure calls to invoke a GPL user function.

Figure 3:
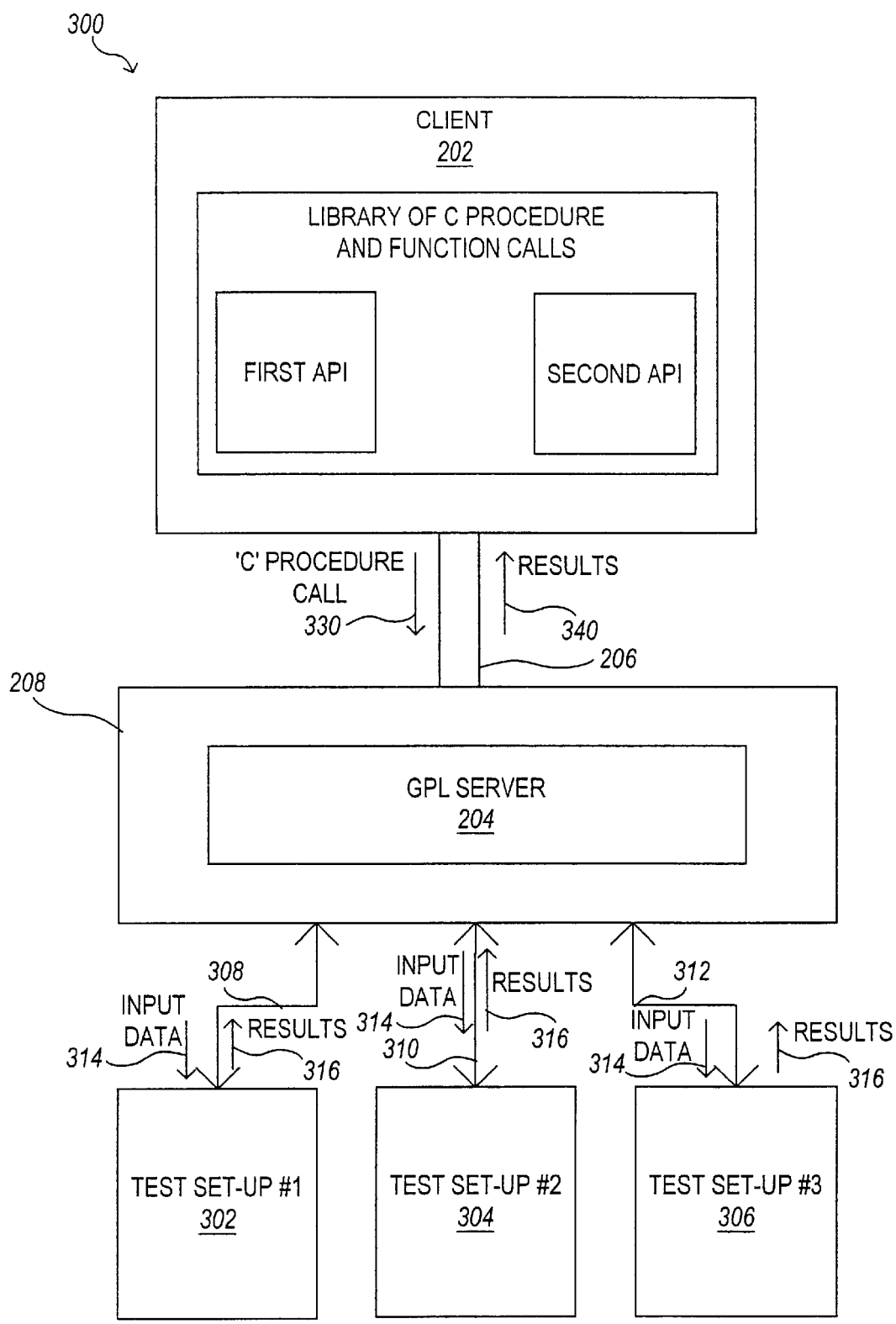
FIG. 3 illustrates a preferred embodiment of the present invention.

FIG. 3 illustrates a simplified description of an example environment 300 in which the present invention is embodied. The example environment 300 comprises a client node 202 in communication with a controller 208 through a communication channel 206. The controller 208 is a computer that contains a GPL server 204. The client node 202 and the GPL server 204 communicate via various network communication protocols, such as Inter-Process Communication (IPC) based on TCP/IP protocols. The GPL server 204 allows the client node 202 to call any one of three GPL user functions to run test set ups #1 302, #2 304, or #3 306, respectively. Each test set-up 302, 304, and 306 is connected to controller 208 via respective interface cables 308, 310, and 312. The interface cables 308, 310, and 312 can be GPIB, RS232, or VXI interfaces. The interface cable type is determined by the instruments to be controlled within each test set-up 302, 304, and 306.

'C' procedure calls 330 from the client node 202 are communicated to the GPL server 204 via IPC. Data traveling from controller 208 to each test set-up 302, 304, and 306 represents input data 314 into a GPL user function. Results 316 traveling from each test set-up 302, 304, and 306 represent output data from a GPL user function. Return results 340 from the GPL server 204 to the client node 202 are also communicated via IPC.

The present invention is described in terms of the above exemplary client/server model 200 and the example environment 300. Description in these terms is provided for convenience only. It is not intended that the invention be limited to application in this exemplary client/server model 200 or example environment 300. In fact, after reading the following description, it will become apparent to a person skilled in the relevant art how to implement the invention with other network topologies having different architectures and levels of complexity and different test scenarios having different architectures and levels of complexity as well.

GPLs are interpreted languages and are not compiled. A GPL environment must, therefore, be instantiated and present to load in libraries and execute user functions. The 'C' library consists of two separate application programmer interfaces (APIs). The first API instantiates the GPL environment, loads in user functions, and executes the user functions.

The first API defines three handles used as arguments for the procedure calls within the API. The first handle is a handle to a GPL server. It is used in the instantiation and deletion of the server. The second handle is a handle to a library of GPL user functions that have been loaded on a GPL server. The last handle is a handle to a GPL user function in a library on a specific GPL server. The handles, defined as 'C' type void, denote pointers that can point to any type of data. They are:

(1) typedef void* GRPC_SERVICE;

(2) typedef void* GRPC_LIBRARY; and (3) typedef void* GRPC_FUNCTION.

The first API also defines a 'C' structure that provides information on the GPL user functions within a particular library loaded into a particular GPL server. The structure is as follows:

```
typedef struct GRPC_FUNC_INFO {
    char          *functionName;      /*The name of the function*/
    int32         numArguments;       /*# of input pins on user
                                         function*/
    enum GPLType  *argumentTypes;     /*argument types, top to
                                         bottom*/
    enum GPLShape *argumentshapes;    /*argument shapes, top to
                                         bottom*/
    int32         numResults;         /*# of output pins on user
                                         function*/
    enum GPLType  *resultTypes;       /*result types, top to bottom*/
    enum GPLShape *resultShapes;      /*result shapes, top to bottom*/
    int32         descriptionLength;  /*number of strings in
                                         description*/
    char          **description;      /*array of null terminated
                                         strings*/
}
```

The procedure calls for the first API are called remote procedure call (RPC) functions. The RPC functions include procedures that:

(1) create and delete a GPL server;
(2) load and unload libraries of GPL user functions from an already instanced GPL server;
(3) allow a user to obtain GRPC_FUNCTION handles and information about the GPL functions in a particular library;
(4) set the execution mode for every GPL function in a library;
(5) perform the calling with arguments and receiving of results of a GPL user function; and
(6) set the timeout and the mode in which the client blocks waiting for results from a call.

The RPC functions are defined in Appendix A.

When a 'C' library procedure call 330 invokes a GPL user function (defined by test set ups 302, 304, and 306), the arguments of the call correspond to the input and output terminals on the user function. The data being sent to the GPL user function is the input data 314. The data being returned from the GPL user function is the result 316 from the execution of the GPL user function. The data of the arguments and the results are GPL data types, known as containers. A container is a complex data type that encapsulates all information about the data. When calling a GPL user function from 'C' code it is necessary to encapsulate the primitive data types in 'C' into GPL containers. Conversely, when receiving results 340 back from a GPL function call, it is necessary to remove the primitive type from the container so that the 'C' code may use the data. The second API in the 'C' library builds and unbuilds these containers.

Within the callable GPL a data container exists as a complex 'C' structure. The user does not have access to this structure directly; the second API provides a pointer to this internal structure. The pointer is called a GPL Data Container or GDC. A GDC is created and managed by functions in the second API.

The GDC types are equivalent to the GPL container types. They include:

(1) GPL_LONG, a 32-bit signed integer;
(2) GPL_DOUBLE, an IEEE 754 64-bit floating point;
(3) GPL_COMPLEX, two numbers of type GPL_DOUBLE corresponding to the real and imaginary part of a complex number;
(4) GPL_PCOMPLEX, two numbers of type GPL_DOUBLE corresponding to the magnitude and phase of a polar complex type;
(5) GPL_STRING, 8-bit ASCII text, null terminated;
(6) GPL_NIL, an empty container returned from a function call; also used to denote an open argument type; cannot be created;
(7) GPL_COORD, two, three, or more numbers of type GPL_DOUBLE;
(8) GPL_ENUM, a number of strings, each associated with an ordinal integer number; the enumerated type can have a specific value, corresponding to one of its ordinal values and associated string;
(9) GPL_RECORD, a record consisting of a schema and related fields; the fields are the GPL data types;
(10) GPL_WAVEFORM, an array of type GPL_DOUBLE which is mapped to an interval of time which starts at time zero; and
(11) GPL_SPECTRUM, an array of type GPL_PCOMPLEX which is mapped to an interval of frequencies.

Each of the above data types can exist in a variety of shapes or dimensions, such as:

(1) GPL_SHAPE_SCALAR, corresponds to numDims=0; types GPL_WAVEFORM and GPL_SPECTRUM cannot have this dimension;
(2) GPL_SHAPE_ARRAY1D, corresponds to numDims=1; types GPL_WAVEFORM and GPL_SPECTRUM always have this dimension;
(3) GPL_SHAPE_ARRAY2D, GPL_SHAPE_ARRAY3D, two and three dimensional arrays, numDims=2,3, respectively; types GPL_WAVEFORM and GPL_SPECTRUM can never have this dimension;
(4) GPL_SHAPE_ARRAY, greater than 3 dimensional; maximum of up to 10 dimensions; and
(5) GPL_SHAPE_ANY, is not a data type; denotes an unrestrained argument for a GPL function call; the identifier numDims is undefined; not possible to create a container of shape GPL_SHAPE_ANY.

Scalar GPL data containers are GDCs with a single value of the particular type. Scalars are the simplest GDC. They cannot be mapped. Functions that build scalar GPL data containers are described in Appendix B. Once a scalar GDC has been built, it is possible to change its value. Functions that allow the changing of scalar GDC values are described in Appendix C. Values can also be retrieved from a scalar GDC. Functions that remove a scalar 'C' data type value from a scalar GDC are described in Appendix D.

An array of GPL types can be mapped. Mappings are determined by a starting and ending value. Intervening values are interpolated in a linear or logarithmic fashion. Mappings are defined as:

(1) GPL_MAPPING_NONE, the array is not mapped;
(2) GPL_MAPPING_LINEAR, the array is mapped linearly; and
(3) GPL_MAPPING_LOG, the array is mapped logarithmically.

Functions that build GDCs which are arrays of the GPL types are described in Appendix E. Functions that retrieve arrays of the simple 'C' types from array GDCs are described in Appendix F. Functions that allow mappings to be set and discovered are described in Appendix G.

Functions that create and delete GPL enumerated data containers are described in Appendix H.

The second API also contains functions to set and get the base attributes of a container, such as the size and number of dimensions of a container, and to free, print and copy GPL data containers. These functions are described in Appendix I.

Error handling for both APIs is accomplished using error numbers and error strings for error codes and messages. The integer and the string for each error code and message, respectively, are not public to the user. They must be accessed through a set of error functions. All functions and procedures return some value. This value may be a pointer to a GDC or a number. In most cases, if the GDC pointer is void or the value is negative, an error has occurred. The user can then call one of two functions to process the error. The error functions are described in Appendix J.

The GPL user function executes in the GPL server, which is a separate process. The GPL user function can be executed in one of two modes, a normal execution mode or a debug execution mode. Normal execution is defined as calling the GPL user function with the executionMode, GRPC_NORMAL_EXECUTION. Under normal execution, a GPL server runs without views, i.e., without being able to view the user function in the display window, unless the user function has a panel and the property Show Panel on Execute is enabled, or the showPanel( ) function is executed. The property Show Panel on Execute and the function showpanel( ) are well known to a person skilled in the relevant art.

The GPL window, when it appears, will display the geometry defined in the grpcCreateService( ) call. It is up to the integrator to choose a geometry that will successfully contain the panels on the user functions. The user of the integrated system can, of course, resize the window using a mouse. If the interface is mouseless, care must be taken so that any panel can fit within the GPL window.

Panels are tied to the execution of the currently called GPL user function. Thus, when the currently executing user function has finished, all panels will disappear along with the GPL window.

When the user function has been called with the executionMode, GRPC_DEBUG_EXECUTION, the user is allowed to debug the user function. This requires that the GPL server display a window with the user function displayed in detail view in a debug user function display.

At the beginning of execution an implicit break point is set on the user function. The user can set breakpoints within the user function and then step into the function using a step button or a continue button. The user can then proceed through the entire function until execution has stopped. At this point the GPL window will disappear.

The user can stop the debug session by pressing the stop button. If this happens the receiving functions within the client API, grpcCallAndReceive( ) and grpcReceive( ), will error. The return code will be Debug Terminated.

While the user is debugging a user function, the client API may be blocked on a grpcCallAndReceive( ) or grpcReceive( ) (with receiveMode set for a blocking read), waiting for the user to finish. In this case use grpcReceive( ) with the receiveMode set to GRPC_NO_WAITING.

The present invention is operable under both UNIX and Win95 Operating Systems. On UNIX, the user will be able to debug the user function in the callable environment, i.e., on the machine executing the client API. For WIN95, the debug session must be on the machine running the server.

For security reasons, the user of the client process must have the same login name on the client machine as on the server machine. Passwords are not used.

While other embodiments of the present invention are possible, the breadth and scope of the present invention should not be limited by any of the above-described embodiments, but should be defined only in accordance with the following claims and their equivalents.

Appendix A

RPC Functions

Instantiation and Deletion of a GPL server

These two procedures are for the creation and deletion of a GPL server.

GRPC SERVICE grpcCreateService(char *hostName, char *display, char *geometry, double aTimeoutInSeconds, unsigned long flags)

This function will instance a GPL service on the host corresponding to the string, hostname. The name can be either a resolvable name or an IP address (e.g. 15.11.29.138).

The argument, timeout, is the number of seconds to wait for the service to be instantiated and to connect to the client. This timeout value is used throughout the callable GPL session unless reset by a call to grpcSetTimeout( ), see page A-5.

The argument, geometry, specifies an initial window geometry, e.g. the string "800x500+0-0" indicates a window that is 800 pixels wide by 500 pixels tall and placed in the lower left corner of the screen.

The argument, "display", indicates either a resolvable host name or an IP address on which the GPL server will display (such as the machine on which the client API is executing). This is for UNIX and X-Windows only. On UNIX, if this argument is a zero length string or a null pointer the default display server is used. It is possible for a GPL service running on UNIX to display on a Windows 95 or NT machine if it is running an X-Server such as Relection-X or eXceed.

If the GPL service is instantiated on a Windows 95 or NT machine and the display name is not the same as the host name an error will occur. The display name should either be the same as hostname or a null pointer or a zero length string.

If a previous call to grpcCreateService( ) has instantiated a service on machine, hostName, to display, then a succeeding call will return that same service. If either the hostname or display is different a new service will be instantiated. If the argument, flags, is set to GRPC_CREATE_NEW, then a new service is instantiated regardless if a previous service is on the same host and displaying to the same display. If the argument, flags, is zero, then the old service at hostName displaying to display is returned.

If the call succeeds a valid GRPC_SERVICE handle is returned. A null GRPC_SERVICE is returned if the call fails or a timeout occurs.

GRPC SERVICE grpcDeleteService(GRPC SERVICE aService)

This function will delete the GPL server pointed to the argument, aService. If the call succeeds, a zero is returned. The memory pointed to by the argument, aService, is freed. If the call succeeds, then a null pointer is returned. If the call fails the argument, aService, is returned.

Loading and Unloading Libraries of User Functions

These two functions load and unload libraries of user functions from an already instanced GPL server.

GRPC LIBRARY grpcLoadLibrary(GRPC SERVICE aService, char *aPath)

The argument aService, is a valid GPL server handle. The argument, aPath, is a valid filename. This filename can either be an absolute path or relative to the PATH environment variable.

If the call succeeds, a valid GRPC_LIBRARY handle is returned. If the call fails a null is returned.

GRPC LIBRARY grpcUnLoadLibrary(GRPC LIBRARY aLibrary)

The argument aLibrary, is a valid GRPC_LIBRARY handle. The memory pointed to by the argument, aLibrary, is freed. If the call succeeds, a null pointer is returned. If the call fails, the argument, aLibrary, is returned.

Function Routines

These routines allow a user to obtain GRPC_FUNCTION handles and information about the functions in a particular library.

GRPCFUNCTION grpcFindFunction(GRPCLIBRARY aLibrary, char *aFunctionName)

This function will return a valid GRPC_FUNCTION handle for the function named in the argument, aFunctionName. The function must exist in the library, aLibrary. If the call succeeds, a valid handle is returned. If the function fails, a null is returned.

char **grpcGetFunctionNames(GRPCLIBRARY aLibrary, int32* numberOfFunctions)

Returns a list of function names for the library, aLibrary. The length of the list is placed in the argument, numberOfFunctions. The memory returned is owned by the caller. If an error occurs, a null is returned.

structGRPC FUNC INFO *grpcFunctionInfo(GRPC FUNCTION aFunction)

Returns a pointer to a FUNC_INFO structure. This structure contains information about the function. The memory returned is owned by the caller, use grpcFreeFunctionInfo( ) to free the memory. If an error occurs, a null is returned.

struct GRPC FUNC INFO *grpcFreeFunctionInfo(struct GRPC FUNC INFO *funcInfo)

This function call is a utility routine to free the memory returned from the preceding call, grpcFunctionInfo( ).

void grpcPrintFunctionInfo(struct GRPC FUNC INFO *aFuncPtr)

This utility function prints to stdout the information contained in the GRPC_FUNC_INFO structure. If the call succeeds, a null pointer is returned. If the call fails, the argument, aFuncPtr, is returned.

GRPC FUNCTION grpcFreeFunction(GRPC FUNCTION aFunction)

This function frees the memory pointed to by the argument, aFunction. If the call succeeds, a null pointer is returned. If the call fails, the argument, aFunction, is returned.

Library Routines

This routine sets the execution mode for every function in a library.

void grpcSetExecutionMode(GRPC LIBRARY aLibrary, unsigned long executionMode)

The argument, executionMode, can be either of the following:

GRPC_DEBUG_EXECUTION
GRPC_NORMAL_EXECUTION

Normal execution allows the GPL user function to execute in a regular fashion. Debug execution allows the user to see the user function in a debug window.

Calling a Function

These functions perform the calling with arguments and receiving of results of a GPL function. The arguments and returned results are GPL Data Containers (GDC).

int32 grpcCallAndReceive(GRPC FUNCTION aFunction, GDC *arguments, GDC **results)

This procedure calls the GPL function aFunction with an array of GPL Data Containers, arguments. The arguments are created using the GPL Data Container API.

This call will block and only return when the GPL function has completed or the timeout period has expired. Any returned results are placed in the memory pointer pointed to by results. The length of the GDC array can be found by using the call to grpcFunctionInfo( ). If the function does not return any results, results will point to null. If the function has no arguments, arguments is ignored. The memory returned via the results argument is owned by the caller. If an error occurs, such as a timeout, the return is a non-zero error code. If the call is successful, zero is returned. If the executionMode is GRPC_DEBUG_EXECUTION and the return from the call is eDebugTerminated, then the user has pressed the stop button and not allowed the function to complete its execution. In this case, there will be no results.

int32 grpcCall(GRPC FUNCTION aFunction, GDC *arguments)

This function is used to call a GPL user function with arguments without blocking and waiting for the function to finish executing and return results. Results are obtained by calling grpcReceive( ). The GPL function is pointed to by the argument, aFunction. The input array of GPL Data Containers is pointed to by arguments.

A successful call results in a return of zero. A non-zero return indicates an error has occurred.

int32 grpcReceive(GRPC FUNCTION aFunction, GDC **results, unsigned int32 receiveMode)

This procedure will return the results of a previous grpcCall( ) execution. The argument, aFunction, must point to the same gpl user function used in the grpccall( ) procedure. The argument, receiveMode, can take three values, defined in gplRPC.h:

GRPC_NO_WAITING
GRPC_WAIT_SLEEPING
GRPC_WAIT_SPINNING

If the choice is GRPC_NO_WAITING, then the call will not block waiting for the results. If the GPL user function has not completed, an error code of eWouldBlock is returned. If the GPL user function has completed, then the error code will be zero and the argument, results, may point to an array of result containers. Any other error would be reflected in a non-zero return code. The timeout value is ignored in the GRPC_NO_WAITING case.

A choice of GRPC_WAIT_SLEEPING or GRPC_WAIT_SPINNING will cause the call to block until the GPL user function has completed. If GRPC_WAIT_SLEEPING is chosen the client process will sleep and possibly be rescheduled by the OS. If GRPC_WAIT_SPINNING is chosen, the client process will busy wait and will not be rescheduled by the OS.

If an error occurs, the return code will be a non-zero error number. If the call is successful the return code will be zero. If the GPL user function has no results, the arguments, results, will be null.

If the executionMode used in the proceeding execution of the grpccall( ) is GRPC_DEBUG_EXECUTION and the return from the call is eDebugTerminated, then the user has pressed the stop button and not allowed the function to complete its execution. In this case, there will be no results.

Utility Routines

These two routines are used to set the timeout and the mode in which the client blocks waiting for results from a call.

int32 grpcSetTimeout(GRPC SERVICE aService, double aTimeoutInSeconds)

This function is used to set the timeout value, aTimeoutInSeconds, for a particular service, aService. The timeout value is used for the routines where a blocking action can occur when waiting for data from the service. This data can be results of an explicit call such as grpcCallAndReceive( ). However, a call such as grpcLoadLibrary( ), will also experience a timeout waiting for the GPL server to respond with a confirmation of the requested action.

A value of zero will cause an infinite timeout to be set.

The call grpcReceive( ) with the receiveMode argument set to NO_WAITING ignores any timeout value.

If an error occurs, a non-zero error code is returned. If the function executes normally, a zero is returned.
int32 grpcSetBehavior(GRPC SERVICE aService unsigned int32 flags)

This function sets the behavior for receiving data from a GPL server, aService. The choices for the argument, flags, are:

GRPC_WAIT_SLEEPING
GRPC_WAIT_SPINNING
GRPC_BUFFER_EXPAND

The flags GRPC_WAIT_SLEEPING and GRPC_WAIT_SPINNING denote how the client blocks waiting for a return from the GPL server. If GRPC_WAIT_SLEEPING is chosen, then the client process will be forced to give up the CPU to other processes. The client process will be rescheduled when either the timeout period has lapsed or the GPL server has returned with expected data. Some overhead will be incurred to place the process back on the CPU. This is the best choice if the client and server process are on the same machine. This avoids any undue swapping of client/server/kernel processes.

The flag, GRPC_WAIT_SPINNING, will cause the client to wait in a polling loop. This is a CPU intensive choice and may degrade overall performance on the client machine. The user must decide whether to use GRPC_WAIT_SLEEPING or GRPC_WAIT_SPINNING based on system (s) configuration, OS characteristics (UNIX vs. Win 95), machine load, and expected wait time.

In both cases, after the timeout period has expired an error will be posted and a blocking call will return with eServiceTimedOut.

The procedure, grpcReceive( ), also uses the two flags, GRPC_WAIT_SLEEPING and GRPC_WAIT_SPINNING. Use of these flags in grpcReceive( ) will override the current setting, but will not set it.

The flag, GRPC_BUFFER_EXPAND, will cause the client to automatically increase the receive and send buffers in response to large arrays of data. The size of the buffers will not decrease. The default, starting size is 8192 bytes.

Appendix B

Scalar GPL Data Containers

Scalar GPL Data Containers are those GDCs with a single value of the particular type. These containers are different than array containers, the number of dimensions is equal to zero. Scalars are the simplest GDC; they cannot be mapped.

Creating Scalars

The following functions create scalar GPL data containers. For each of the GPL types, with the exception of GPL_ENUM, the initial value of the scalar GDC is an argument. The values of the enumerated type, the strings, is set with one of the enum support functions.

All of the functions in this set return a GDC, a pointer to a gpl data container. If the returned value is a null pointer, then an error has occurred. Use the three functions discussed in Appendix J to process the error.
GDC gdcCreateLongScalar(int32 anInteger)

Returns a GDC of type GPL_LONG with a value equal to the integer argument, anInteger. The type of the argument, 'int32', is type defined in gplData.h as type long. A returned null pointer indicates an error has occurred.

GDC gdcCreateDoubleScalar(double aDouble)

Returns a GDC of type GPL_DOUBLE with a value equal to the double argument, aDouble.
GDC gdcCreateStringScalar(char* aString)

Returns a GDC of type GPL_STRING with a value equal to the null terminated string argument, aString. The memory pointed to by the char* argument is copied.
GDC gdcCreateComplexScalar(double realPart, double imaginaryPart)

Returns a GDC of type GPL_COMPLEX with a value equal to the complex number defined by the two double arguments.
GDC gdcCreatePComplexScalar(double magnitude, double phase)

Returns a GDC of type GPL_PCOMPLEX with a value equal to the polar complex number defined by the two double arguments. The first argument is the vector length, the second is the angle in radians. Degrees or radians are not supported.
GDC gdcCreate2DCoordScalar(double xValue, double yValue)

Returns a GDC of type GPL_COORD with a value equal to the two double arguments.
GDC gdcCreate3DCoordScalar(double xValue, double yValue, double zValue)

Returns a GDC of type GPL_COORD with a value equal to the three double arguments.
GDC gdcCreateCoordScalar(int16 fieldCount, double *values)

Returns a GDC of type GPL_COORD with a dimension equal to the argument, fieldCount. The argument, values, points to an array of type double. The length of the array must equal fieldCount. The memory pointed to by values is copied.
GDC gdcCreateRecordScalar(int16 fieldCount, GDC* fieldValues, char** fieldNames)

Returns a GDC of type GPL_RECORD. The int16 argument, fieldCount is the number of fields in the record. The type of the first argument, int1 6, is type defined in gplData.h as type short. The GDC pointer, fieldValues, is an array of GPL data containers each of which is the value of a field. The size of the array must correspond to the value of the first argument. The third argument fieldNames, is an array of null terminated strings which correspond to the names of each field. The number of strings must correspond to the value of the first argument. The memory represented by the pointers in the second and third arguments is copied.
GDC gdcCreateRecordArray(int16 fieldCount, GDC* fieldValues char** fieldNames) ?

Appendix C

Setting Scalar Values

Once a scalar GDC has been created it is possible to change its value with the following functions. The GDC argument must be of the same type as the call specifies, if not an error will occur. If an error has occurred, a nonzero value is returned; the original GDC remains unchanged.
Any n
int32 gdcSetLongScalar(GDC aVD, int32 aLong)

Returns the argument, aVD, with the argument, aLong, as its new value. The old value is lost. The type, int32, is type defined to long in gplData.h
int32 gdcSetDoubleScalar(GDC aVD, double aReal)

Returns the argument, aVD, with the argument, aReal, as its new value. The old value is lost.
int32 gdcSetStrinqScalar(GDC aVD, char *aString)

Returns the argument, aVD, with the argument, aString, as its new value. The old value is lost. The memory pointed to by the argument is copied. The memory of the GDC is managed internally.

int32 gdcSetComplexScalar(GDC aVD, double realPart, double imaginaryPart

Returns the argument, aVD, with the arguments, realPart and imaginarytPart, as its new value. The old value is lost.

int32 gdcSetPComplexScalar(GDC aVD, double magnitude, double phase)

Returns the argument, aVD, with the arguments, magnitude and phase, as its new value. The old value is lost.

int32 gdcSet2DCoordScalar(GDC aVD, double xValue, double yValue)

Returns the argument aVD, with the arguments, xValue and yValue, as its new value. The old value is lost.

int32 gdcSet3DCoordScalar(GDC aVD, double xValue, double yValue, double zValue)

Returns the argument aVD, with the arguments, xValue, yValue, and zValue as its new value. The old value is lost.

int32 gdcSetCoordScalar(GDC aVD, int16 aFieldCount, double *values)

Returns the argument, aVD, with the argument, values, as its new value. The old value is lost. The number of fields that the container is configured for must equal the length of the array pointed to by the argument, values, and must equal the argument aFieldCount. See the function gdcCreateCoordScalar( ) in Appendix B. The number of fields in a coord tuple can be changed from the original number by using the call gdcCoordSetNumCoordDims( ), see Appendix I. The memory pointed to by the argument, values, is copied into the container.

Appendix D

Retrieving Values from a Scalar GDC

These procedures will return the value of a Scalar GDC.

int32 gdcGetLonqScalarValue(GDC aVD, int32 *aLong)

Places into the memory pointed to by the argument, aLong, the value of the argument, aVD. The GDC argument must be of type GPL_LONG. An error will result in a non zero return value.

int32 gdcGetDoubleScalarValue(GDC aVD, doubt *aReal)

Places into the memory pointed to by the argument, aReal, the value of the argument, aVD. The GDC argument must be of type GPL_DOUBLE. An error will result in a non zero return value.

char *gdcGetStringScalarValue(GDC aVD)

Returns a string which is the current value of the argument, aVD. The value of the argument GDC must be of type GPL_STRING. An error will result in a return of a NULL pointer. The memory returned is not a copy of the data within the container, aVD; it is still owned by the container.

int32 gdcGetComplexScalarValue(GDC aVD, gplComplex *aComplex)

Returns into the structure of type gplComplex pointed to by argument, aComplex, the value of the argument aVD. The GDC argument must be of type GPL_COMPLEX. An error will result in a non-zero return value. The structure, gplComplex, is defined in gplData.h as:

type of struct {double rval, ival;} gplComplex;

int32 gdcGetPComplexScalarValue(GDC aVD, gplPComplex *aPComplex)

Returns into the structure of type gplPComplex pointed to by argument, aPComplex, the value of the argument aVD. The GDC argument must be of type GPL_PCOMPLEX. An error will result in a non-zero return value. The structure, gplPComplex, is defined in gplData.h as:

type of struct{double mag, phase;} gplPComplex;

int32 gdcGet2DCoordScalarValue(GDC aVD, gpl2DCoord *aCoord)

Returns into the structure, gpl2DCoord, pointed to by the argument, aCoord, the value of the argument, aVD. The GDC argument must be of type GPL_COORD. An error will result in a non-zero return value. The structure, gpl2DCoord, is defined in gplData.h as:

type of struct{double xval, yval;} gpl2DCoord;

int32 gdcGet3DCoordScalarValue (GDC aVD gpl3DCoord *aCoord)

Returns into the structure, gpl3DCoord, pointed to by the argument, aCoord, the value of the argument, aVD. The GDC argument must be of type GPL_COORD. An error will result in a non-zero return value. The structure, gpl3DCoord, is defined in gplData.h as:

type of struct{double xval, yval, zval;) gpl3DCoord;

double *gdcGetCoordScalarValue(GDC aVD, int16 *fieldCount)

Returns an array of doubles that are the fields of the multi-dimensional coordinate pointed to by the argument, aVD. The GDC argument must be of type GPL_COORD. The argument pointer, fieldCount, will contain the number of fields after a successful return. An error will result in the return of a null pointer. The memory returned is not a copy of the data within the container, aVD; it is still owned by the container.

Appendix E

Array GPL Data Containers

Creating Array Containers

These functions create GDC which are arrays of the GPL types. The values supplied by the user are copied into the GDC, the callers memory is never used. If an error occurs a null pointer is returned.

GDC gdcCreateLong1DArray(int32 numberOfElements, int32 *values)

Returns a GDC of type GPL_LONG which is allocated to a size equal to the argument, numberOfElements. The array of data pointed to by the argument, values, must be of the same specified size. The type of the argument, 'int32', is type defined to type long in gplData.h GDC gdcCreateString1DArray(int32 numberOfStrings, char **strings)

Returns a GDC of type GPL_STRING which is allocated to a size equal to the argument, numberOfStrings. The argument, strings, points to an array of pointers which in turn point to null terminated strings. The number of strings in the array must equal the specified size. The type of the argument, 'int32', is type defined to type long in gplData.h.

GDC gdcCreateDoubleIDArray(int32 numberOfElements, double *values)

Returns a GDC of type GPL_DOUBLE which is allocated to a size equal to the argument, numberOfElements. The argument, values, points to an array of data. The number of doubles in the array must equal the specified size. The type of the argument, 'int32', is type defined to type long in gplData.h.

GDC gdcCreateComplex1DArray(int32 numberOfElements, gplComplex *values)

Returns a GDC of type GPL_COMPLEX which is pre-allocated to a size equal to the argument, numberOfElements. The type of the argument, 'int32', is type defined to type long in gplData.h. The argument, values, points to an array of structures of type gplComplex. This structure is defined in gplData.h as:

type of struct {double rval, ival;) gplComplex;
GDC gdcCreatePComplexIDArray(int32 numberOfElements gplPComplex *values)

Returns a GDC of type GPL__PCOMPLEX which is preallocated to a size equal to the argument, numberOfElements. 'The type of the argument, 'int32", is type defined to type long in gplData.h. The argument, values, points to an array of structures of type gplPComplex. This structure is defined in gplData.h as:
type of struct {double mag, phase;) gplPComplex;
GDC gdcCreate2DCoordlDArray(int32 numberOfElements gpl2DCoord *values)

Returns a GDC of type GPL__COORD which is preallocated to a size equal to the argument, numberOfElements. The type of the argument, 'int32', is type defined to type long in gplData.h. The argument, values, points to an array of structures of type gpl2DCoord. This structure is defined in gplData.h as:
type of struct {double xval, yval;) gpl2DCoord;
GDC gdcCreate3DCoordIDArray(int32 numberOfElements gpl3DCoord *values);

Returns a GDC of type GPL__COORD which is preallocated to a size equal to the argument, numberOfElements. The type of the argument, 'int32', is type defined to type long in gplData.h. The argument, values, points to an array of structures of type gpl3DCoord. This structure is defined in gplData.h as:
type of struct {double xval, yval, zval) gpl3DCoord;
GDC gdcCreateCoord1DArray(int32 numberOfElements, int16 fieldCount, double * values);

Returns a GDC of type GPL__COORD which is preallocated to a size equal to the argument, numberOfElements. The argument fieldCount, is the number of fields in the coordinates. The type of the argument, 'int32', is type defined to type long in gplData.h. The argument, values, points to an array of type double. The length of this array must be equal to the product of numberOfElements and fieldCount.
GDC gdcCreateWaveform(int32 numPts, double from, double thru, VMT mapType, double *data)

Returns a GDC of type GPL__WAVEFORM with a number of samples equal to the argument, numPts. The starting and ending times for the waveform are the arguments, from and thru. The argument, mapType, is of type VMT, defined in gplData.h; it declares what type of mapping is used (see Appendix G). The array of doubles pointed to by the argument, data, must be equal in size to the argument numPts. The type of the argument, 'int32', is type defined to type long in gplData.h.
GDC gdcCreateSpectrum(int32 numPts, double from, double thru, VMT mapType, gplPComplex *values)

Returns a GDC of type GPL__SPECTRUM with a number of samples equal to the argument, numPts. The starting and ending frequencies for the spectrum are the arguments, from and thru. The argument, mapType, is of type VMT, defined in gplData.h; it declares what type of mapping is used (see Appendix G). The array of type gplPComplex pointed to by the argument, data, must be equal in size to the argument, numPts. Type gplPComplex is a structure defined in gplData.h:
type of struct {double mag, phase;} gplPComplex.

The array of structures is copied. The type of the argument, 'int32' is type defined to type long in gplData.h.

Appendix F

Retrieving ID values from a 1-D array GDC

These functions retrieve the simple 'C' types from a GDC. The return value is always a pointer to an array of simple 'C' types or convenient structures. The input container must be an array container, if not, an error will occur. A return of a null pointer indicates an error. Any information returned in argument pointers is only valid if the function returns a non-null pointer. Memory returned is that of the argument container.
int32*gdcGetLong1DArray(GDC aVD, int32 *numberOfElements)

Returns a pointer to an array of type int32. The argument, aVD, must be of type, GPL__LONG, and be an array. The value returned in the pass-by-reference argument, numberOfElements, is the length of the array.
char **gdcGetString1DArray (GDC aVD, int32 *numberOfElements)

Returns a pointer to an array of pointers each pointing to a null terminated string. The argument, aVD, must be of type GPL__STRING. The value returned in the pass-by-reference argument, numberOfElements, is the number of strings.
double *gdcGetDouble1DArray(GDC aVD, int32 *numberOfElements)

Returns a pointer to an array of type double. The argument aVD, must be of type, GPL__DOUBLE. The value returned in the pass-by-reference argument, numberOfElements, is the length of the array.
gplComplex*gdcGetComplex1DArray(GDC aVD, int32 *numberOfElements)

Returns a pointer to an array of structures of type, gplComplex. This structure is defined in gplData.h as:
type of struct {double rval, ival;} gplComplex;

The argument, aVD, must be of type GPL__COMPLEX. The value returned in the pass-by-reference argument, numberOfElements, is the length of the array.
gplPComplex*gdcGetPComplex1DArray(GDC aVD, int32 *numberOfElements)

Returns a pointer to an array of structures of type, gplPComplex. This structure is defined in gplData.h as:
type of struct {double mag, phase;} gplPComplex;

The argument, aVD, must be of type GPL__PCOMPLEX. The value returned in the pass-by-reference argument, numberOfElements, is the length of the array.
gpl2DCoord *gplGet2DCoord1DArray(GDC aVD, int32 *numberOfElements)

Returns a pointer to an array of structures of type, gpl2DCoord. This structure is defined in gplData.h as:
type of struct {double xval, yval;} gpl2DCoord;

The argument, aVD, must be of type GPL__COORD. The value returned in the pass-by-reference argument, numberOfElements, is the length of the array.
Gpl3DCoord *gplGet3DCoord1DArray(GDC aVD, int32 *numberOfElements)

Returns a pointer to an array of structures of type, gpl3DCoord. This structure is defined in gplData.h as:
type of struct {double xval, yval, zval;} gpl3DCoord;

The argument, aVD, must be of type GPL__COORD. The value returned in the pass-by-reference argument, numberOfElements, is the length of the array.
double *gdcGetCoordl1DArray(GDC aVD, int32 *numberOfElements, intl 6 *fieldCount)

Returns a pointer to an array of type double. The argument, aVD, must be of type GPL__COORD. The value returned in the pass-by-reference argument, numberOfElements, is the number of coordinate tuples in the array. The value returned in the pass-by-reference argument, fieldCount, is the number of fields in each coordinate tuple. The length of the returned array is the product of numberOfElements and fieldCount.
double *gdcGetWaveform(GDC aVD, int32 *numberOfElements, double *from, double *thru, VMT *mapType)

Returns a pointer to an array of type double. The argument, aVD, must be of type GPL_WAVEFORM. The pass-by-reference arguments numberOfElements, from, thru, and mapType return, respectively, the length of the array, the start time, the end time, and the type of mapping.
GplPComplex *gdcGetSpectrum(GDC aVD, int32 *numberOfElements, double *from, double *thru, VMT *mapType)

Returns a pointer to an array of structures of type gplPComplex. This structure is defined in gplData.h as:
type of struct{double mag, phase;} gplPComplex;

The argument, aVD, must be of type GPL_WAVEFORM. The pass-by-reference arguments numberOfElements, from, thru, and mapType return, respectively, the length of the array of structures, the starting frequency, the ending frequency, and the type of mapping.

Appendix G

Mapping of Arrays

A waveform is a mapped 1-dimensional array. The floating point numbers are mapped to a time span. The first element in the array is mapped to a start time, the last element in the array is mapped to an end time. Any array container can be mapped. These functions allow mappings to be set and discovered.
int32 gdcAtDimPutLowerLimit(GDC aVD, int16 aDim, double lowerLimit)

This function takes the container, aVD, and maps the first element of the dimension, aDIM, to the value, lowerLimit. The GDC is returned. If an error occurs a non-zero value is returned.
int32 gdcAtDimPutUpperLimit(GDC aVD, int16 aDim, double upperLimit)

This function takes the container, aVD, and maps the last element of the dimension, aDim, to the value, upperLimit. The GDC is returned. If an error occurs a non-zero value is returned.
int32 gdcAtDimPutRang(GDC aVD, Int16 aDim, double lowerLimit, double upperLimit)

This function takes the container, aVD, and at dimension, aDim, maps the limits lowerLimit and upperLimit to the first and last elements in the dimension. This is equivalent to calling gdcAtDimPutLowerLimit( ) followed by gdcAtDimPutUppeLimit( ). An error will result in the return of a non-zero value.
int32 gdcAtDimPutMapping(GDC aVD, int16 aDim, VMT aMapping)

This function takes the container, aVD, at dimension, aDim, and applies a mapping defined by the argument, aMapping, between the lower and upper limits set by gdcAtDimPutLowerLimit( ) and gdcAtDimPutUpperLimit( ) or gdcAtDimPutRange( ). The possible values for the maptypes are defined in gplData.h as:
enum veeMap Type {
    GPL_MAPPING_NONE,
    GPL_MAPPING_LINEAR,
    GPL_MAPPING_LOG };
An error will result in the return of a non-zero value.
int32 gdcMakeMappingSame(GDC vd1, GDC vd2)

This function takes the container, vdl, and forces the mappings to be identical with vd2. The containers must have the same number of dimensions. The size of each dimension need not be the same. A non-zero return indicates an error has occurred.
int32 gdcUnMap(GDC aVD)

Removes all mapping information from the container, aVD. A non-zero return indicates an error has occurred.

Appendix H

GPL Enumerated Data Containers

GPL data containers of type GPL_ENUM are an array of strings associated with an ordinal value. This ordinal value can be the index of each string in the array or it can be any int32. The GPL enumerated type forms the basis for most user interface widgets in GPLs. An enumerated type can have a current value which is one of the ordinal number/string tuples. This usually represents a choice of a user among several possible choices.
GDC gdcCreateEnumScalar(intl6 numberOfPairs)

Returns a GDC of type GPL_ENUM which contains string-ordinal pairs. The number of pairs is equal to the argument, numberOfPairs. The type of the argument, intl6, is type defined to type short in gplData.h. The data container has been pre-allocated for the string-ordinal tuples. An error has occurred if a null GDC is returned.
int32 gdcEnumAddEnumPair(GDC aVD, char *aString, int32 anOrdinal)

Returns the GDC pointed to by the argument, aVD), containing a new enumerated pair constructed from the text pointed to by the argument, aString, and the positive argument, anOrdinal. The argument container must be of type GPL_ENUM. This function can be called only as many times as there a pairs in the container, This is set by the call to gdcCreateEnumScalar( ). An error has occurred if a non-zero value is returned.
int32 gdcEnumDeleteEnumPairWithStr(GDC aVD, char *aString)

Returns the GDC pointed to by the argument, aVD, with the tuple with the exact same string pointed to by the argument, aString, deleted. The argument container must be of type GPL_ENUM. An error has occurred if a non-zero value is returned.
int32 gdcEnumDeleteEnumPairWithOrdinal(GDC aVD, int32 anOrdinal)

Returns the GDC pointed to by the argument, aVD, with the tuple with the exact same ordinal value as the argument, anOrdinal, deleted. The argument container must be of type GPL_ENUM. An error has occurred if a non-zero value is returned.
int32 gdcSetEnumScalar(GDC aVD, intl6 anOrdinal)

Returns the argument, aVD, with the argwnent, anOrdinalt, as its new enumerated value. The value in anOrdinalt must be an ordinal of one of the enumerated pairs contained in the container. The type, int32, is type defined to long in gplData.h. The argument must be of type GPL_ENUM. The enumerated type will default to the tuple at position zero (first in the array of tuples) if it has not been set. An error has occurred if a non-zero value is returned.
intl6 gdcGetEnumValue(GDC aVD)

Returns the current "selected" ordinal of the argument, aVD. The argument must be of type GPL_ENUM. The enumerated type will default to the tuple at position zero (first in the array of tuples) if it has not been set. If an error occurs the return value is less than zero. This returned negative number is not the error number. Use gplGetErrorNumber( ), see Appendix J.
char * gdcGetEnumString(GDC aVD)

Returns the string that is associated with the current "selected" ordinal of the argument, aVD. The argument must be of type GPL_ENUM. An error will result in the return of a NULL pointer. The enumerated type will default to the tuple at position zero (first in the array of tuples) if it has not been set. The memory returned is owned by the caller.

Appendix I

Container Utility Functions

These functions are used to set and get the base attributes and to free, print and copy GPL Data Containers. A base attribute would be the size and number of dimensions of a container, indeed, using these functions is the only method of creating multi-dimension arrays. If these functions are used, it is up to the caller to modify other attributes of the container at the low level.

Container types, dimensions, sizes, and total elements.

These functions are used to get and set the number of dimensions and the length of each dimension in an already instanced container. Other functions allow the container type to be discovered as well as access to the raw block of memory where a container's current values are stored.

enum gplType gdcType(GDC aVD)

Return the type of the argument container. Will return GPL_NOTDEFINED1 if an error occurs.

void *gdcGetValue(GDC aVD)

Returns the values of a container as a raw block of memory. The convenient structures for coordinates or the complex types are not used. The caller must know the simple data type, number of dimensions, and the size of each dimension. The memory is owned by the container. Returns null if an error occurs.

int16 gdcNumCoordDims(GDC aVD)

Returns the number of fields in each coordinate tuple.

int32 gdcCoordSetNumCoordDims(GDC aVD, int16 dimensions)

Change the number of coordinate dimensions in a container of type coordinate. Possible values for the argument, dimensions, are 2 through 10. The ordered tuple, (xy), has a coordinate dimension of 2, the tuple, (x,y,z,t), has a dimension of 4. If needed, memory is reallocated. Any current values are lost once the change has occurred. A non-zero return indicates an error has occurred.

int32 gdcSetNumDims(GDC aVD, int16 dimensions)

Set the number of dimensions for a GDC. Valid dimensions are 0 (scalar) through 10. A 1-dimensional array is equal to 1. Any current data is lost A non-zero return indicates an error has occurred. This call must be followed by a call to gdcSetDimSizes( ).

int32 gdcSetDimSizes(GDC aVD, int32 *dimensionSizes)

Sets the size of each dimension in the container, aVD. The argument, dimensionSizes, is an array whose length is equal to the number of dimensions of the container. A non-zero return indicates an error has occurred. Memory is reallocated and data lost.

int16 gdcGetNumDims(GDC aVD)

Returns the number of dimensions for the argument, aVD. This is a number between 0 (scalar) and 10. A negative return value indicates an error has occurred.

int32 *gdcGetDimSizes(GDC aVD)

Returns an array whose length is equal to the number of dimensions of the container, aVD. Each number of the array is the length of a dimension. A non-sero return indicates an error has occurred.

int32 vdsCurNumElements(GDC aVD)

Returns the number of elements in the container. A negative number indicates an error has occurred.

Memory and Printing

GDC gdcCopy(GDC aVD)

This function returns an exact copy of the argument container, aVD. All memory is copied. A return of a null container indicates an error has occurred.

void *gdcFree(GDC aVD)

Will free the GPL container, aVD, returning a null pointer if it succeeds.

void gdcPrint (GDC aVD)

Will print information on a container to stdout.

Appendix J

Error Handling

The set of functions and procedures that make up the 'C' library use an error number and error string for error codes and messages. The integer and the string are not public to the user, they must be accessed via a set of functions. All functions and procedures return some value. This value may be a pointer to a GDC or a number. In most cases if the GDC pointer is void or the value negative an error has occurred. The user can then call one of these following functions to process the error.

int16 gplGetErrorNumber( )

Returns the value of the current error number. This call does not void the error number. However, in most cases the user will not have to explicitly clear the error number with the function above. If an API call returns an int32, the returned code is the same error number as a subsequent call to this function.

char *gplGetErrorString( )

Returns a pointer to error string. This memory is not owned by the user, it is static to the function.

What is claimed is:

1. An application programmer interface for interfacing a callable graphical programming language (GPL) application with a non-GPL client application, wherein said GPL application interprets input terminals comprising GPL data containers (GDCs) each of which is formatted according to a GPL data type, and wherein said non-GPL client application employs 'C' language data types, comprising:

a GPL server creation procedure which instantiates a GPL server;

a GPL function library load procedure which loads a GPL function from said instantiated GPL server;

a GPL function handle procedure which provides a function handle for said GPL function;

a GDC build procedure which encapsulates client data into a GDC;

a GPL function call procedure which allows a client to invoke said GPL function in said GPL application using said GPL handle and one or more GOCs built by said GDC build procedure, and which receives GDC results from said invoked GPL function; and a GDC unbuild procedure which extracts 'C' type data from said GDC results.

* * * * *